United States Patent
Yu et al.

(10) Patent No.: US 9,394,438 B2
(45) Date of Patent: Jul. 19, 2016

(54) RESIN COMPOSITION, COPPER-CLAD LAMINATE AND PRINTED CIRCUIT BOARD FOR USE THEREWITH

(71) Applicant: ELITE MATERIAL CO., LTD., Tao-Yuan Hsien (TW)

(72) Inventors: Li-Chih Yu, Tao-Yuan Hsien (TW); Tse-An Lee, Tao-Yuan Hsien (TW)

(73) Assignee: ELITE MATERIAL CO., LTD., Tao-Yuan (TW)

( * ) Notice: Subject to any disclaimer, the term of this patent is extended or adjusted under 35 U.S.C. 154(b) by 28 days.

(21) Appl. No.: 13/759,800

(22) Filed: Feb. 5, 2013

(65) Prior Publication Data
US 2014/0178696 A1 Jun. 26, 2014

(30) Foreign Application Priority Data
Dec. 21, 2012 (TW) .............................. 101148953 A

(51) Int. Cl.
*B32B 27/38* (2006.01)
*C08L 63/00* (2006.01)

(52) U.S. Cl.
CPC .......... *C08L 63/00* (2013.01); *Y10T 428/31529* (2015.04)

(58) Field of Classification Search
None
See application file for complete search history.

(56) References Cited

U.S. PATENT DOCUMENTS

| | | | |
|---|---|---|---|
| 2011/0053447 A1* | 3/2011 | Su et al. .................. | 442/147 |
| 2011/0139496 A1* | 6/2011 | Nakamura .................. | 174/256 |
| 2013/0306357 A1* | 11/2013 | Hsu et al. .................. | 174/250 |
| 2014/0113118 A1* | 4/2014 | Wang et al. .................. | 428/209 |
| 2015/0353730 A1* | 12/2015 | Hsieh .................. | C08L 77/06 |
| | | | 524/538 |

FOREIGN PATENT DOCUMENTS

TW I311568 7/2009

OTHER PUBLICATIONS

TW I311568 is a Taiwanese patent with an amendment including changes to claims 1 and 6, and these changes to claims 1 and 6 are not shown in the item of IDS filed on Feb. 5, 2013.
English translation of claims 1 and 6 of TW I311568 after the amendment, Jul. 1, 2009.
English Abstract of TW I311568, Jul. 1, 2009.

\* cited by examiner

*Primary Examiner* — Coris Fung
(74) *Attorney, Agent, or Firm* — WPAT, P.C., Intellectual Property Attorneys; Anthony King

(57) ABSTRACT

A resin composition includes (A) an epoxy resin; (B) a benzoxazine (BZ) resin; (C) a styrene maleic anhydride (SMA) copolymer; and (D) a polyester. The resin composition includes specific ingredients of a polyester and is characterized by specific proportions thereof so as to achieve a low delta Tg value of copper clad laminates manufactured in accordance with the resin composition and attain a low dielectric constant, a low dielectric dissipation factor, high heat resistance, and high fire retardation of the copper clad laminates and printed circuit boards manufactured in accordance with the resin composition.

6 Claims, No Drawings

RESIN COMPOSITION, COPPER-CLAD LAMINATE AND PRINTED CIRCUIT BOARD FOR USE THEREWITH

CROSS-REFERENCE TO RELATED APPLICATION

This non-provisional application claims priority under 35 U.S.C. §119(a) on Patent Application No(s). 101148953 filed in Taiwan, R.O.C. on Dec. 21, 2012, the entire contents of which are hereby incorporated by reference.

FIELD OF THE INVENTION

The present invention relates to resin compositions, and more particularly, to a resin composition for use with copper-clad laminates (CCL) and printed circuit boards.

BACKGROUND OF THE INVENTION

To get in line with the global trend of environmental protection and eco-friendly regulations, electronic product manufacturers nowadays are developing and manufacturing halogen-free electronic products. Advanced countries and electronic manufacturing giants set forth schedules of launching mass production of halogen-free electronic products. As a result of the promulgation of the Restriction of Hazardous Substances (RoHS) by the European Union, hazardous substances, such as lead, cadmium, mercury, hexavalent chromium, poly-brominated biphenyl (PBB), and poly-brominated diphenyl ether (PBDE), are strictly prohibited from being used in manufacturing electronic products or their parts and components. A printed circuit board (PCB) is an indispensable and fundamental basis of the semiconductor industry and electronic industry; hence, printed circuit boards bore the brunt of international halogen-free regulations when international organizations set forth strict requirements of the halogen content of printed circuit boards. For example, the International Electrotechnical Commission (IEC) 61249-2-21 requires that bromide content and chloride content shall be less than 900 ppm and the total halogen content shall be less than 1500 ppm. The Japan Electronics Packaging and Circuits Association (JPCA) requires that both bromide content and chloride content shall be less than 900 ppm. To enforce its green policies, Greenpeace calls on manufacturers worldwide to get rid of polyvinyl chloride (PVC) and brominated flame retardants (BFRs) from their electronic products in order to conform with the lead-free and halogen-free requirements of green electronics. Hence, the industrial sector nowadays is interested in rendering related materials halogen-free and sees this technique as one of its key research topics.

Electronic products nowadays have the trend toward compactness and high-frequency transmission; hence, circuit boards nowadays typically feature a high-density layout and increasingly strict material requirements. To mount high-frequency electronic components on a circuit board, it is necessary that the substrate of the circuit board is made of a material of a low dielectric constant (Dk) and dielectric dissipation factor (DO in order to maintain the transmission speed and the integrity of a signal transmitted. To allow the electronic components to function well at a high temperature and a high-humidity environment, it is necessary for the circuit board to be heat resistant, fire resistant, and of low hygroscopicity. Epoxy resin is adhesive, heat resistant, and malleable and thus is widely applicable to encapsulants and copper clad laminates (CCL) of electronic components and machinery. From the perspective of fire prevention, epoxy resin is incapable of flame retardation, and thus epoxy resin has to acquire flame retardation capability by including a flame retardant therein. For example, a halogen, such as bromine, is included in epoxy resin to not only bring about flame retardation capability thereof but also enhance epoxy reactivity. Furthermore, after long use, halides are likely to decompose at high temperature, which often results in corrosion of fine circuits. Also, upon their combustion, discarded electronic parts and components produce halides which are most hazardous and environmentally unfriendly. To find an alternative to the aforesaid halide-based flame retardant, researchers attempt to use a phosphorous compound as a flame retardant, for example, adding phosphate ester to an epoxy resin composition.

A conventional circuit board manufacturing method, such as a conventional method of manufacturing a copper-clad substrate (also known as copper clad laminate, CCL), involves heating and combining a reinforcement material (such as a glass fiber fabric) and a thermosetting resin composition made of an epoxy resin and a curing agent to form a prepreg, and then laminating the prepreg and the upper and lower copper foils together at a high temperature and a high pressure. The prior art usually teaches using a thermosetting resin composed of an epoxy resin and a hydroxyl-containing phenol novolac resin curing agent. Due to the combination of the phenol novolac resin and the epoxy resin, epoxide ring-opening reactions end up with another hydroxyl which not only increases the dielectric constant and the dielectric dissipation factor inherently, but also reacts with water readily and thereby renders the thermosetting resin more hygroscopic.

Glass transition temperature (Tg) is the most important index to the heat resistance of copper clad laminates. Glass transition temperature (Tg) increases with the heat resistance of copper clad laminates. The degree of cure of copper clad laminates is denoted with delta Tg (where delta Tg=Tg2−Tg1), which is measured with an apparatus, such as DSC, TMA, or DMA. A small delta Tg value indicates that the copper clad laminates are completely cured. Conversely, a large delta Tg value indicates that the copper clad laminates are incompletely cured or are unlikely to be completely cured. When incompletely cured, the copper clad laminates manifest high hygroscopicity, low heat resistance, and unstable high-frequency dielectric property (Dk or DO to the detriment of the copper clad laminates.

Taiwan Patent 1311568 discloses a phosphorous-containing epoxy resin composition comprising ingredients: (A) a phosphorous-containing epoxy resin; (B) a curing agent; (C) one or more epoxy resin; and (D) an inorganic filler. The ingredient (B), the curing agent, comprises a benzoxazine (BZ) resin and a styrene maleic anhydride (SMA) copolymer. However, copper clad laminates manufactured in accordance with the aforesaid resin composition are flawed with an overly large delta Tg value. In general, those copper clad laminates which are manufactured in accordance with the aforesaid resin composition using the curing agent comprising a benzoxazine (BZ) resin and a styrene maleic anhydride (SMA) copolymer have a delta Tg value larger than or equal to 10° C.

Accordingly, it is important for printed circuit board material suppliers to develop materials which are halogen-free and have a low delta Tg value, and apply the materials to printed circuit board manufacturing.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a resin composition, such that copper clad laminates manufactured in accordance with the resin composition have a low delta Tg value, by overcoming a drawback of the prior art, that is, conventional copper clad laminates manufactured from a co-hardener system comprising a benzoxazine (BZ) resin and a styrene maleic anhydride (SMA) copolymer are either incompletely cured or unlikely to be completely cured.

It is an objective of the present invention to provide a resin composition comprising ingredients: (A) an epoxy resin; (B) a benzoxazine (BZ) resin; (C) a styrene maleic anhydride (SMA) copolymer; and (D) a polyester. The present invention provides a polyester composition comprising specific ingredients and characterized by specific proportions thereof so as to achieve a low delta Tg value of copper clad laminates manufactured in accordance with the resin composition and attain a low dielectric constant, a low dielectric dissipation factor, high heat resistance, and high fire retardation of the copper clad laminates and printed circuit boards manufactured in accordance with the resin composition.

In order to achieve the above and other objectives, the present invention provides a resin composition comprising the following ingredients: (A) 100 parts by weight of an epoxy resin; (B) 10 to 80 parts by weight of a benzoxazine (BZ) resin; (C) 5 to 100 parts by weight of a styrene maleic anhydride (SMA) copolymer; and (D) 5 to 100 parts by weight of a polyester.

The copper clad laminates manufactured in accordance with the aforesaid the resin composition of the present invention exhibit an advantageous feature, that is, delta Tg value ≤4° C., to thereby overcome a drawback of the prior art, that is, conventional copper clad laminates manufactured by means a curing agent comprising BZ and SMA exhibit an disadvantageous feature, that is, delta Tg value ≥10° C. It is because copper clad laminates with a delta Tg value ≥10° C. is unlikely to be cured completely, thereby resulting in deterioration of heat resistance and dielectric property after absorption of water.

The purpose of the resin composition is to manufacture a prepreg, a resin film, a copper-clad laminate, and a printed circuit board. Hence, the resin composition of the present invention, which comprises specific ingredients and is characterized by specific proportions thereof, is effective in achieving a low dielectric constant and a low dielectric dissipation factor, and thus is suitable for manufacturing a prepreg or a resin film and is applicable to copper-clad laminates and printed circuit boards.

In the halogen-free resin composition of the present invention, the ingredient (A) epoxy resin includes at least one of bisphenol A epoxy resin, bisphenol F epoxy resin, bisphenol S epoxy resin, bisphenol AD epoxy resin, phenol novolac epoxy resin, bisphenol A novolac epoxy resin, bisphenol F novolac epoxy resin, o-cresol novolac epoxy resin, trifunctional epoxy resin, tetrafunctional epoxy resin, multifunctional epoxy resin, dicyclopentadiene (DCPD) epoxy resin, phosphorous-containing epoxy resin, DOPO epoxy resin, DOPO-HQ epoxy resin, p-xylene epoxy resin, naphthalene epoxy resin, benzopyran epoxy resin, biphenyl novolac epoxy resin, isocyanate modified epoxy resin, phenol benzaldehyde epoxy resin, and phenol aralkyl novolac epoxy resin. The DOPO epoxy resin is one selected from the group consisting of DOPO-PN epoxy resin, DOPO-CNE epoxy resin, and DOPO-BPN epoxy resin. The DOPO epoxy resin is one selected from the group consisting of DOPO-HQ-PN epoxy resin, DOPO-HQ-CNE epoxy resin, and DOPO-HQ-BPN epoxy resin.

As regards the resin composition of the present invention, the ingredient (B) benzoxazine (BZ) resin includes at least one of bisphenol A benzoxazine (BZ) resin, bisphenol F benzoxazine (BZ) resin, and phenolphthalein benzoxazine (BZ) resin. Specifically speaking, preferably, the ingredient (B) benzoxazine (BZ) resin includes at least one of the following formulas (1) to (3):

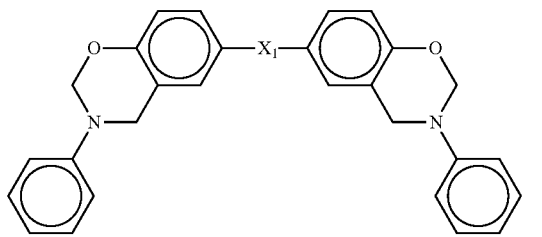

(1)

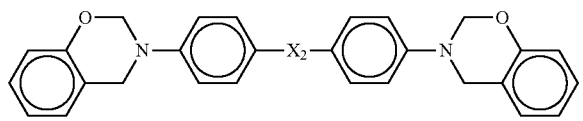

(2)

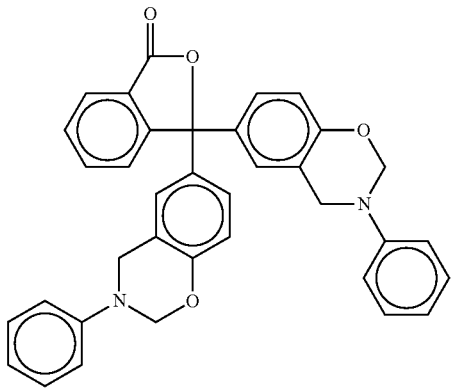

(3)

wherein $X_1$ and $X_2$ are independent of each other and denote R, Ar, or —$SO_2$—; R is one of —$C(CH_3)_2$—, —CH($CH_3$)—, —$CH_2$— and substituted or unsubstituted dicyclopentadiene (DCPD); Ar is one of substituted or unsubstituted benzene, biphenyl, naphthalene, novolac, bisphenol A, bisphenol A novolac, bisphenol F, and bisphenol F novolac functional group which are marketed under the brand names LZ-8270, LZ-8280, and LZ-8290 by Huntsman.

As regards the resin composition of the present invention, given 100 parts by weight of an epoxy resin, preferably, 10 to 80 parts by weight of a benzoxazine (BZ) resin is added thereto, wherein the content of the benzoxazine (BZ) resin thus added allows the resin composition to achieve a low dielectric dissipation factor (Df) as expected. If less than 10 parts by weight of the benzoxazine (BZ) resin is added, the expected low dielectric dissipation factor (Dk) will not be achieved. If more than 80 parts by weight of the benzoxazine (BZ) resin is added, the copper clad laminates manufactured in accordance with the resin composition will exhibit deteriorated heat resistance.

As regards the resin composition of the present invention, the proportion of styrene (S) to maleic anhydride (MA) in the ingredient (C) styrene maleic anhydride (SMA) copolymer is 1/1, 2/1, 3/1, 4/1, 6/1, or 8/1. The brand names of styrene maleic anhydride (SMA) copolymer marketed by Cray valley are, namely SMA-1000, SMA-2000, SMA-3000, EF-30, EF-40, EF-60 and EF-80. Furthermore, the styrene maleic anhydride (SMA) copolymer can also be an esterified styrene maleic anhydride (SMA) copolymer whose brand names include SMA1440, SMA17352, SMA2625, SMA3840 and SMA31890. As regards the resin composition of the present invention, the styrene maleic anhydride (SMA) copolymer is one of the above-mentioned or a combination thereof.

As regards the resin composition of the present invention, given 100 parts by weight of an epoxy resin, preferably, 5 to 100 parts by weight of a styrene maleic anhydride (SMA) copolymer is added thereto, wherein the content of the styrene maleic anhydride (SMA) copolymer thus added allows the resin composition to achieve a low dielectric constant (Dk) as expected. If less than 5 parts by weight of the styrene maleic anhydride (SMA) copolymer is added, the expected low dielectric constant will not be achieved. If more than 100 parts by weight of the styrene maleic anhydride (SMA) copolymer is added, a prepreg produced from the resin composition will have unattractive appearance and surface picking, thereby reducing the conforming rate of the prepreg production process, not to mention that the copper clad laminates thus manufactured will exhibit deteriorated heat resistance.

As regards the resin composition of the present invention, the ingredient (D) polyester is produced by esterification of an aromatic compound of a dicarboxylic acid radical and an aromatic compound of a dihydroxy, and is marketed, for example, under the brand names EXB-9460 (dicyclopentadienyldiphenol polyester) and EXB-9465 by Dainippon Ink and Chemicals Incorporated (DIC).

As regards the resin composition of the present invention, given 100 parts by weight of an epoxy resin, preferably, at least 5 parts by weight of a polyester is added thereto, wherein the content of the polyester thus added allows the resin composition to achieve a low delta Tg value as expected. If less than 5 parts by weight of the polyester is added, the expected low delta Tg value will not be achieved. Furthermore, with a polyester being a determining factor in an increase in the total raw material cost, an overly large polyester content in the resin composition increases the cost of the resin composition greatly and thus reduces its product competitiveness.

The resin composition of the present invention further comprises a halogen-free flame retardant. The halogen-free flame retardant is either a nitrogen-containing flame retardant or a phosphorous-containing flame retardant. The halogen-free flame retardant selectively includes, but is not limited to, at least one of bisphenol diphenyl phosphate, ammonium poly phosphate, hydroquinone bis-(diphenyl phosphate), bisphenol A bis-(diphenylphosphate), tri(2-carboxyethyl) phosphine (TCEP), tris(1-chloro-2-propyl) phosphate (TCPP), trimethyl phosphate (TMP), dimethyl methyl phosphonate (DMMP), resorcinol dixylenylphosphate (RDXP, PX-200), phosphazene such as SPB-100, m-phenylene methylphosphonate (PMP), melamine polyphosphate, melamine cyanurate, and tri-hydroxy ethyl isocyanurate. The halogen-free flame retardant can also be 9,10-dihydro-9-oxa-10-phosphaphenanthrene-10-oxide (DOPO), DOPO-containing phenol resin (such as DOPO-HQ, DOPO-PN, or DOPO-BPN), DOPO-containing epoxy resin, or DOPO-HQ-containing epoxy resin, wherein DOPO-BPN can be bisphenol novolac, such as DOPO-BPAN, DOPO-BPFN, or DOPO-BPSN.

As regards the resin composition of the present invention, given 100 parts by weight of an epoxy resin, preferably, 10 to 100 parts by weight of a halogen-free flame retardant is added thereto, wherein the content of the halogen-free flame retardant thus added allows the resin composition to attain flame retardation. If less than 10 parts by weight of the halogen-free flame retardant is added, the expected flame retardation will not be attained. If more than 100 parts by weight of the halogen-free flame retardant is added, the copper clad laminates manufactured in accordance with the resin composition will exhibit increased hygroscopicity and deteriorated heat resistance.

The resin composition of the present invention further comprises one, or a combination, of an inorganic filler, a curing accelerator, a silane coupling agent, a toughening agent, and a solvent.

The resin composition of the present invention further comprises an inorganic filler. Due to the inorganic filler, the resin composition exhibits enhanced thermal conductivity, improved thermal expansion properties, and enhanced mechanical strength. The inorganic filler is uniformly distributed in the resin composition. The inorganic filler comprises silicon dioxide (molten, non-molten, porous, or hollow), aluminum oxide, hydrogen aluminum oxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcinated talc, talc, silicon nitride, and/or calcinated kaolinite. The inorganic filler is spherical, fiber-like, plate-like, particle-like, sheet-like, or needle-shaped, and is selectively pretreated with a silane coupling agent (silane or siloxane).

The inorganic filler comprises particulate powder with a particle diameter of less than 100 μm, preferably particulate powder with a particle diameter of 1 nm to 20 μm, and most preferably nanoscale particulate powder with a particle diameter of less than 1 μm. The needle-shaped inorganic filler comprises powder with a diameter of less than 50 μm and a length of 1 to 200 μm.

As regards the resin composition of the present invention, given 100 parts by weight of an epoxy resin, 10 to 1000 parts by weight of an inorganic filler can be added thereto. If less than 10 parts by weight of the inorganic filler is added to resin composition, the resultant resin composition will lack significant thermal conductivity, improved thermal expansion, and enhanced mechanical strength. In case more than 1000 parts by weight of the inorganic filler is added to the resin composition, the resultant resin composition will manifest deteriorated porosity flow and deteriorated copper foil attachment.

The curing accelerator of the present invention comprises a catalyst, such as a lewis base or a lewis acid. The lewis base includes imidazole, boron trifluoride-amine, ethyltriphenyl phosphonium chloride, 2-methylimidazole (2MI), 2-phenyl-1H-imidazole (2PZ), 2-ethyl-4-methylimidazole (2E4MI), triphenylphosphine (TPP), and/or 4-dimethylaminopyridine (DMAP). The lewis acid comprises metallic salt compounds, such as the metallic salts of manganese, iron, cobalt, nickel, copper, and zinc, namely metallic catalysts, such as zinc caprylate, and cobalt caprylate.

The silane coupling agent comprises silanes and siloxanes which are of the following types, namely amino silanes, amino siloxanes, epoxy silanes, and epoxy siloxanes, according to functional group.

The toughening agent of the present invention comprises rubber resin, carboxyl-terminated butadiene acrylonitrile (CTBN) rubber, and/or core-shell rubber.

The solvent of the present invention comprises methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethyl formamide, propylene glycol methyl ether, or a mixture thereof.

The resin composition of the present invention further comprises one, or a combination, of phenol resin, phenol novolac resin, polyphenylene ether resin, cyanate ester resin, isocyanurate resin, maleimide resin, styrene resin, butadiene resin, phenoxy resin, polyamide resin, and polyimide resin.

Another objective of the present invention is to provide a prepreg characterized by a low dielectric constant, a low dielectric dissipation factor, heat resistance, fire retardation, and low hygroscopicity, and being halogen-free. Accordingly, the prepreg of the present invention comprises a reinforcing material and the resin composition, wherein the resin composition is attached to the reinforcing material and heated up at a high temperature to become semi-cured. The reinforcing material is a fibrous material, a woven fabric, or a nonwoven fabric, such as a glass fiber fabric, and is intended to increase the mechanical strength of the prepreg. Also, the reinforcing material can be selectively pretreated with a silane coupling agent or a siloxane coupling agent. For example, the glass fiber fabric is pretreated with the silane coupling agent.

When heated up at a high temperature or heated up at a high temperature and a high pressure, the prepreg can be cured to form a cured prepreg or a solid-state insulating layer, wherein, if the resin composition contains a solvent, the solvent will evaporate and escape during a high-temperature heating process.

Another objective of the present invention is to provide a copper-clad laminate which has low dielectric properties, low hygroscopicity, high heat resistance, and high fire retardation, is halogen-free, and is suitable for use with circuit boards dedicated to high-speed, high-frequency signal transmission. Accordingly, the present invention provides a copper-clad laminate comprising at least two copper foils and at least one insulating layer. The copper foils each further comprise an alloy of copper, aluminum, nickel, platinum, silver, and/or gold. The insulating layer is formed by curing the prepreg at a high temperature and a high pressure, for example, by compressing the prepreg sandwiched between two pieces of copper foil at a high temperature and a high pressure.

Advantages of the copper-clad laminate of the present invention include, but are not limited to, the following: a low dielectric constant, a low dielectric dissipation factor, low hygroscopicity, high heat resistance, high fire retardation, high thermal conductivity, and being halogen-free. The copper-clad laminate undergoes a wiring fabrication process to enable the manufacturing of a circuit board, wherein, after electronic components have been mounted on and electrically connected to the circuit board, the circuit board operates well even at adverse environments, such as high temperature and high humidity.

Yet another objective of the present invention is to provide a printed circuit board which has low dielectric properties, low hygroscopicity, high heat resistance, and high fire retardation, is halogen-free, and is suitable for use in high-speed, high-frequency signal transmission. The circuit board comprises at least one copper-clad laminate and can be manufactured by a conventional process.

The embodiments below further disclose and describe the present invention so as to enable persons skilled in the art to implement the present invention accordingly. The embodiments below are illustrative, rather than restrictive, of the present invention. All equivalent modifications and changes made to the embodiments below by persons skilled in the art without departing from the spirit embodied in the present invention shall fall within the scope of the present invention.

DETAILED DESCRIPTION OF THE PREFERRED EMBODIMENTS

Objectives, features, and advantages of the present invention are hereunder illustrated with specific embodiments.

Embodiment 1 (E1)

A resin composition comprises the following ingredients:
(A) 100 parts by weight of dicyclopentadiene (DCPD) epoxy resin (HP-7200HH);
(B) 70 parts by weight of benzoxazine (BZ) resin (8280);
(C) 30 parts by weight of styrene maleic anhydride (SMA) (EF-60);
(D) 20 parts by weight of a polyester (EXB-9460);
(E) 44 parts by weight of an inorganic filler (fused silica);
(F) 0.1 part by weight of a catalyst (2E4MI); and
(G) 46 parts by weight of a solvent (MEK).

Embodiment 2 (E2)

A resin composition comprises the following ingredients:
(A) 100 parts by weight of o-cresol novolac epoxy resin (N-680);
(B) 70 parts by weight of benzoxazine (BZ) resin (8280);
(C) 30 parts by weight of styrene maleic anhydride (SMA) (EF-60);
(D) 20 parts by weight of a polyester (EXB-9460);
(E) 44 parts by weight of an inorganic filler (fused silica);
(F) 0.1 part by weight of a catalyst (2E4MI); and
(G) 46 parts by weight of a solvent (MEK).

Embodiment 3 (E3)

A resin composition comprises the following ingredients:
(A) 40 parts by weight of dicyclopentadiene (DCPD) epoxy resin (HP-7200HH);
(B) 60 parts by weight of o-cresol novolac epoxy resin (N-680);
(C) 70 parts by weight of benzoxazine (BZ) resin (8280);
(D) 30 parts by weight of styrene maleic anhydride (SMA) (EF-60);
(E) 20 parts by weight of a polyester (EXB-9460);
(F) 44 parts by weight of an inorganic filler (fused silica);
(G) 0.1 part by weight of a catalyst (2E4MI); and
(H) 46 parts by weight of a solvent (MEK).

Embodiment 4 (E4)

A resin composition comprises the following ingredients:
(A) 40 parts by weight of dicyclopentadiene (DCPD) epoxy resin (HP-7200HH);
(B) 60 parts by weight of o-cresol novolac epoxy resin (N-680);
(C) 70 parts by weight of benzoxazine (BZ) resin (8280);
(D) 30 parts by weight of styrene maleic anhydride (SMA) (EF-60);
(E) 20 parts by weight of a polyester (EXB-9460);
(F) 40 parts by weight of a flame retardant (XZ92741);
(G) 52 parts by weight of an inorganic filler (fused silica);
(H) 0.1 part by weight of a catalyst (2E4MI); and
(I) 67 parts by weight of a solvent (MEK).

Embodiment 5 (E5)

A resin composition comprises the following ingredients:
(A) 60 parts by weight of dicyclopentadiene (DCPD) epoxy resin (HP-7200HH);
(B) 40 parts by weight of o-cresol novolac epoxy resin (N-680);
(C) 40 parts by weight of benzoxazine (BZ) resin (8280);
(D) 35 parts by weight of styrene maleic anhydride (SMA) (EF-60);
(E) 15 parts by weight of a polyester (EXB-9460);
(F) 35 parts by weight of a flame retardant (XZ92741);
(G) 45 parts by weight of an inorganic filler (fused silica);
(H) 0.1 part by weight of a catalyst (2E4MI); and
(I) 67 parts by weight of a solvent (MEK).

Comparison 1 (C1)

A resin composition comprises the following ingredients:
(A) 100 parts by weight of dicyclopentadiene (DCPD) epoxy resin (HP-7200HH);
(B) 70 parts by weight of benzoxazine (BZ) resin (8280);
(C) 30 parts by weight of styrene maleic anhydride (SMA) (EF-60);
(D) 44 parts by weight of an inorganic filler (fused silica);
(E) 0.1 part by weight of a catalyst (2E4MI); and
(F) 46 parts by weight of a solvent (MEK).

Comparison 2 (C2)

A resin composition comprises the following ingredients:
(A) 100 parts by weight of o-cresol novolac epoxy resin (N-680);
(B) 70 parts by weight of benzoxazine (BZ) resin (8280);
(C) 30 parts by weight of styrene maleic anhydride (SMA) (EF-60);
(D) 44 parts by weight of an inorganic filler (fused silica);
(E) 0.1 part by weight of a catalyst (2E4MI); and
(F) 46 parts by weight of a solvent (MEK).

Comparison 3 (C3)

A resin composition comprises the following ingredients:
(A) 40 parts by weight of dicyclopentadiene (DCPD) epoxy resin (HP-7200HH);
(B) 60 parts by weight of o-cresol novolac epoxy resin (N-680);
(C) 70 parts by weight of benzoxazine (BZ) resin (8280);
(D) 30 parts by weight of styrene maleic anhydride (SMA) (EF-60);
(E) 44 parts by weight of an inorganic filler (fused silica);
(F) 0.1 part by weight of a catalyst (2E4MI); and
(G) 46 parts by weight of a solvent (MEK).

Comparison 4 (C4)

A resin composition comprises the following ingredients:
(A) 40 parts by weight of dicyclopentadiene (DCPD) epoxy resin (HP-7200HH);
(B) 60 parts by weight of o-cresol novolac epoxy resin (N-680);
(C) 70 parts by weight of benzoxazine (BZ) resin (8280);
(D) 30 parts by weight of styrene maleic anhydride (SMA) (EF-60);
(E) 40 parts by weight of a flame retardant (XZ92741);
(F) 52 parts by weight of an inorganic filler (fused silica);
(G) 0.1 part by weight of a catalyst (2E4MI); and
(H) 67 parts by weight of a solvent (MEK).

Comparison 5 (C5)

A resin composition comprises the following ingredients:
(A) 40 parts by weight of dicyclopentadiene (DCPD) epoxy resin (HP-7200HH);
(B) 60 parts by weight of o-cresol novolac epoxy resin (N-680);
(C) 90 parts by weight of benzoxazine (BZ) resin (8280);
(D) 30 parts by weight of styrene maleic anhydride (SMA) (EF-60);
(E) 40 parts by weight of a flame retardant (XZ92741);
(F) 52 parts by weight of an inorganic filler (fused silica);
(G) 0.1 part by weight of a catalyst (2E4MI); and
(H) 67 parts by weight of a solvent (MEK).

Comparison 6 (C6)

A resin composition comprises the following ingredients:
(A) 40 parts by weight of dicyclopentadiene (DCPD) epoxy resin (HP-7200HH);
(B) 60 parts by weight of o-cresol novolac epoxy resin (N-680);
(C) 70 parts by weight of benzoxazine (BZ) resin (8280);
(D) 120 parts by weight of styrene maleic anhydride (SMA) (EF-60);
(E) 40 parts by weight of a flame retardant (XZ92741);
(F) 52 parts by weight of an inorganic filler (fused silica);
(G) 0.1 part by weight of a catalyst (2E4MI); and
(H) 67 parts by weight of a solvent (MEK).

Comparison 7 (C7)

A resin composition comprises the following ingredients:
(A) 60 parts by weight of dicyclopentadiene (DCPD) epoxy resin (HP-7200HH);
(B) 40 parts by weight of o-cresol novolac epoxy resin (N-680);
(C) 40 parts by weight of benzoxazine (BZ) resin (8280);
(D) 35 parts by weight of styrene maleic anhydride (SMA) (EF-60);
(E) 110 parts by weight of a polyester (EXB-9460);
(F) 35 parts by weight of a flame retardant (XZ92741);
(G) 45 parts by weight of an inorganic filler (fused silica);
(H) 0.1 part by weight of a catalyst (2E4MI); and
(I) 67 parts by weight of a solvent (MEK).

The ingredients of the resin composition in embodiments 1 through 5 (E1~E5) are enumerated in Table 1. The ingredients of the resin composition in comparisons 1 through 7 (C1~C7) are enumerated in Table 3.

The ingredients of the resin composition in embodiments 1 through 5 (E1~E5) and comparisons 1 through 7 (C1~C7) are evenly mixed in a blender batch by batch before being put into an impregnation tank. Then, a glass fiber fabric is passed through the impregnation tank to allow the resin composition to adhere to the glass fiber fabric before undergoing a heating and baking process to become semi-cured, thereby forming a prepreg.

A piece of 18-μm copper foil, four pieces of the prepreg prepared by the same batch, and another piece of 18-μm copper foil are stacked in sequence before being laminated against each other in vacuum at 190° C. for two hours to form a copper-clad laminate (CCL). The four pieces of prepreg are cured to form an insulating layer between the two copper foils.

A physical properties measurement process is performed on the non-copper-containing substrate and copper clad laminates. The physical properties measurement process measures the glass transition temperature (Tg1, Tg2, and delta Tg value, with a differential scanning calorimeter (DSC), where delta Tg=Tg2−Tg1), copper clad laminate immersion tin test (solder dip 288° C., 10 seconds, testing heat resistance, S/D), and heat resistance (flaming test, UL94, with the ranking: V-0>V-1>V-2).

The results of measurement of the resin composition in embodiments 1 through 5 (E1~E5) are shown in Table 2. The results of measurement of the resin composition in comparisons 1 through 7 (C1~C7) are shown in Table 4.

TABLE 1

| ingredients | | E1 | E2 | E3 | E4 | E5 |
|---|---|---|---|---|---|---|
| dicyclopentadiene (DCPD) epoxy resin | HP-7200HH | 100 | 0 | 40 | 40 | 60 |
| o-cresol novolac epoxy resin | N-680 | 0 | 100 | 60 | 60 | 40 |
| benzoxazine (BZ) resin | 8280 | 70 | 70 | 70 | 70 | 40 |
| styrene maleic anhydride (SMA) | EF-60 | 30 | 30 | 30 | 30 | 35 |
| polyester | EXB-9460 | 20 | 20 | 20 | 20 | 15 |
| flame retardant | XZ92741 | 0 | 0 | 0 | 40 | 35 |
| inorganic filler | fused silica | 44 | 44 | 44 | 52 | 45 |
| catalyst | 2E4MI | 0.1 | 0.1 | 0.1 | 0.1 | 0.1 |
| solvent | MEK | 46 | 46 | 46 | 67 | 67 |

TABLE 2

| property test | method | E1 | E2 | E3 | E4 | E5 |
|---|---|---|---|---|---|---|
| Tg1 (° C.) | DSC | 155 | 174 | 168 | 167 | 163 |
| Tg2 (° C.) | DSC | 157 | 176 | 170 | 170 | 166 |
| Delta Tg (Tg2 − Tg1) | DSC | 2 | 2 | 2 | 3 | 3 |
| UL94 | UL94 | V-1 | V-1 | V-1 | V-0 | V-0 |
| S/D | 10 s, dip cycles | >10 | >10 | >10 | >10 | >10 |

The resin composition in embodiments 1 through 5 (E1~E5) of the present invention includes a polyester whereby all copper clad laminates manufactured in accordance with the resin composition exhibit a delta Tg value of less than 4° C. to thereby overcome the aforesaid drawback of the prior art, that is, copper clad laminates manufactured by means of a curing agent comprising benzoxazine (BZ) resin and styrene maleic anhydride (SMA) copolymer exhibit an overly large delta Tg value (delta Tg value ≥10° C.).

Embodiment 3 combines a dicyclopentadiene (DCPD) epoxy resin and an o-cresol novolac epoxy resin in achieving a delta Tg value of less than 4° C. Embodiment 4 employs a flame retardant to thereby achieve a delta Tg value of less than 4° C. Embodiment 5 features variations in the proportion of the ingredients to each other in the resin composition of the present invention, and thus it achieves a delta Tg value of less than 4° C.

TABLE 3

| ingredients | | C1 | C2 | C3 | C4 | C5 | C6 | C7 |
|---|---|---|---|---|---|---|---|---|
| dicyclopentadiene (DCPD) epoxy resin | HP-7200HH | 100 | 0 | 40 | 40 | 40 | 40 | 60 |
| o-cresol novolac epoxy resin | N-680 | 0 | 100 | 60 | 60 | 60 | 60 | 40 |
| benzoxazine (BZ) resin | 8280 | 70 | 70 | 70 | 70 | 90 | 70 | 40 |
| styrene maleic anhydride (SMA) | EF-60 | 30 | 30 | 30 | 30 | 30 | 120 | 35 |
| polyester | EXB-9460 | 0 | 0 | 0 | 0 | 0 | 0 | 110 |
| flame retardant | XZ92741 | 0 | 0 | 0 | 40 | 40 | 40 | 35 |
| inorganic filler | fused silica | 44 | 44 | 44 | 52 | 52 | 52 | 45 |
| catalyst | 2E4MI | 0.1 | 0.1 | 0.1 | 0.1 | 0.1 | 0.1 | 0.1 |
| solvent | MEK | 46 | 46 | 46 | 67 | 67 | 67 | 67 |

TABLE 4

| property test | method | C1 | C2 | C3 | C4 | C5 | C6 | C7 |
|---|---|---|---|---|---|---|---|---|
| Tg1 (° C.) | DSC | 146 | 166 | 159 | 157 | 161 | 169 | 163 |
| Tg2 (° C.) | DSC | 157 | 176 | 170 | 170 | 174 | 181 | 165 |
| Delta Tg (Tg2 − Tg1) | DSC | 11 | 10 | 11 | 13 | 13 | 12 | 2 |
| UL94 | UL94 | V-1 | V-1 | V-1 | V-0 | V-0 | V-0 | V-0 |
| S/D | 10 s, dip cycles | >10 | >10 | >10 | >10 | 8 | 5 | >10 |
| total cost | unit price | average | average | average | average | average | average | high |

A comparison of embodiments 1 through 5 (E1~E5) and comparisons 1 through 4 (C1~C4) reveals that all the copper clad laminates manufactured in accordance with the resin composition that lacks a polyester and by means of a co-hardener system comprising BZ and SMA exhibit a delta Tg value larger than or equal to 10° C. and thus are unlikely to be completely cured. A comparison of comparison 5 and comparison 6 reveals that copper clad laminates manufactured by a curing agent that contains too much benzoxazine (BZ) resin or styrene maleic anhydride (SMA) copolymer exhibit a reduction of heat resistance. Comparison 7 affirms that a polyester accounts for an abrupt increase in the total cost of the resin composition and therefore a reduction in product competitiveness.

Hence, the present invention meets the three requirements of patentability, namely novelty, non-obviousness, and industrial applicability. Regarding novelty and non-obviousness, the present invention provides a resin composition comprising specific ingredients of a polyester and characterized by specific proportions thereof so as to achieve a low delta Tg value of the copper clad laminates manufactured in accordance with the resin composition, and attain a low dielectric constant, a low dielectric dissipation factor, high heat resistance, and high fire retardation of the copper clad laminates and printed circuit boards manufactured in accordance with the resin composition. Regarding industrial applicability, products derived from the present invention meet market demands fully.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A resin composition, comprising:
   (A) 100 parts by weight of a dicyclopentadiene (DCPD) epoxy resin, an o-cresol novolac epoxy resin or a combination thereof;
   (B) 40 to 70 parts by weight of a bisphenol F benzoxazine (BZ) resin;
   (C) 30 to 35 parts by weight of a styrene maleic anhydride (SMA) copolymer with ratio of styrene to maleic anhydride being 6/1; and
   (D) 15 to 20 parts by weight of a dicyclopentadienyldiphenol polyester.

2. The resin composition of claim 1, further comprising a halogen-free flame retardant being at least one of bisphenol diphenyl phosphate, ammonium poly phosphate, hydroquinone bis-(diphenyl phosphate), bisphenol A-bis-(diphenyl phosphate), tri(2-carboxyethyl)phosphine (TCEP), tris(1-chloro-2-propyl) phosphate (TCPP), trimethyl phosphate (TMP), dimethyl methyl phosphonate (DMMP), resorcinol dixylenylphosphate (RDXP), phosphazene, m-phenylene methylphosphonate (PMP), melamine polyphosphate, melamine cyanurate and tri-hydroxy ethyl isocyanurate, 9,10-dihydro-9-oxa-10-phosphaphenanthrene-10-oxide (DOPO), DOPO-containing phenol resin, DOPO-containing novolac resin, DOPO-containing epoxy resin, and DOPO-HQ-containing epoxy resin.

3. The resin composition of claim 1, further comprising at least one of an inorganic filler, a curing accelerator, a silane coupling agent, a toughening agent, and a solvent.

4. A prepreg made from the resin composition of claim 1 and a reinforcing material.

5. A copper-clad laminate made from the prepreg of claim 4 and at least one copper foil.

6. A printed circuit board comprising the copper-clad laminate of claim 5.

* * * * *